(12) United States Patent
Yu et al.

(10) Patent No.: US 10,117,107 B2
(45) Date of Patent: Oct. 30, 2018

(54) METHOD, APPARATUS, SYSTEM AND COMPUTER PROGRAM

(71) Applicant: NOKIA SOLUTIONS AND NETWORKS OY, Espoo (FI)

(72) Inventors: Qiaoling Yu, Shanghai (CN); Jiang Wang, Shanghai (CN); Yuanping Zhu, Shanghai (CN); Yong Teng, Beijing (CN); Kari Veikko Horneman, Oulu (FI); Ling Yu, Kauniainen (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/523,876

(22) PCT Filed: Nov. 11, 2014

(86) PCT No.: PCT/CN2014/090830
§ 371 (c)(1),
(2) Date: May 2, 2017

(87) PCT Pub. No.: WO2016/074157
PCT Pub. Date: May 19, 2016

(65) Prior Publication Data
US 2017/0318472 A1    Nov. 2, 2017

(51) Int. Cl.
*H04W 72/00* (2009.01)
*H04W 16/14* (2009.01)
*H04W 52/18* (2009.01)

(52) U.S. Cl.
CPC .......... *H04W 16/14* (2013.01); *H04W 52/18* (2013.01)

(58) Field of Classification Search
CPC ............................. H04W 16/14; H04W 52/18
(Continued)

(56) References Cited

U.S. PATENT DOCUMENTS 6,496,490 B1 * 12/2002 Andrews ............... H04W 16/10
370/329
7,864,697 B2 * 1/2011 Papandriopoulos .. H04J 3/1694
370/252
(Continued)

FOREIGN PATENT DOCUMENTS

CN    101155007 A    4/2008
CN    101765121 A    6/2010
(Continued)

OTHER PUBLICATIONS

Gonzalez et al., "Static Inter-Cell Interference Coordination Techniques for LTE Networks: A Fair Performance Assessment"; 2008 (11 pages).
(Continued)

*Primary Examiner* — Marceau Milord
(74) *Attorney, Agent, or Firm* — Brake Hughes Bellermann LLP

(57) ABSTRACT

An example implementation may include controlling receiving, in a first network, negotiation information for the asymmetric power usage of a shared spectrum; determining, in the first network, a minimum spectrum demand in dependence on the negotiation information; controlling receiving, in the first network, a minimum spectrum demand from at least one second network; and determining, in the first network, asymmetric power usage of the shared spectrum in dependence on the minimum spectrum demand from the at least one second network and the minimum spectrum demand of the first network.

25 Claims, 11 Drawing Sheets

(58) Field of Classification Search
USPC .......................................... 455/454, 450, 522
See application file for complete search history.

(56) References Cited

U.S. PATENT DOCUMENTS

| | | | | |
|---|---|---|---|---|
| 8,238,303 B2* | 8/2012 | Zangi | ................... | H04L 5/0007 370/330 |
| 8,948,801 B2* | 2/2015 | Schmidt | ................ | H04W 28/16 455/450 |
| 9,036,518 B2* | 5/2015 | Takagi | .............. | H04W 72/0426 370/310.2 |
| 9,363,829 B2* | 6/2016 | Di Girolamo | .... | H04W 74/0808 |
| 9,426,812 B2* | 8/2016 | Wang | ................... | H04W 16/10 |
| 9,743,432 B2* | 8/2017 | Ji | ...................... | H04W 74/0866 |
| 9,749,872 B2* | 8/2017 | Zhu | ........................ | H04W 16/14 |
| 9,807,778 B2* | 10/2017 | Ma | ....................... | H04W 72/085 |
| 9,826,476 B2* | 11/2017 | Teng | ................. | H04W 52/0206 |
| 2006/0121906 A1* | 6/2006 | Stephens | ............... | H04W 16/18 455/446 |
| 2008/0108365 A1 | 5/2008 | Buddhikot et al. | | |
| 2009/0034554 A1 | 2/2009 | Evans et al. | | |
| 2009/0161617 A1 | 6/2009 | Abedi | | |
| 2009/0163221 A1 | 6/2009 | Abedi | | |
| 2010/0113060 A1* | 5/2010 | Bai | ....................... | H04W 16/14 455/453 |
| 2013/0035124 A1 | 2/2013 | Schmidt et al. | | |
| 2014/0206377 A1 | 7/2014 | Priotti | | |
| 2015/0043491 A1* | 2/2015 | Eng | ....................... | H04W 16/14 370/329 |
| 2015/0373554 A1* | 12/2015 | Freda | .................... | H04W 16/14 455/450 |

FOREIGN PATENT DOCUMENTS

| | | |
|---|---|---|
| CN | 103763708 A | 4/2014 |
| EP | 3099096 A1 | 11/2016 |

OTHER PUBLICATIONS

Wang et al., "Fairness Guaranteed Cooperative Resource Allocation in Femtocell Networks"; Wireless Personal Communications; Feb. 2013 (17 pages).

International Search Report for International Application No. PCT/CN2014/090830, dated Jul. 7, 2015, 3 pages.

Written Opinion for International Application No. PCT/CN2014/090830, dated Jul. 7, 2015, 5 pages.

European Search Report for Application No. 14905904.0, dated May 23, 2018, 13 pages.

Teng et al.; "Co-Primary Spectrum Sharing for Denser Networks in Local Area"; 2014 9th International Conference on Cognitive Radio Oriented Wireless Networks (Crowncom); Jun. 2, 2014; pp. 120-124.

* cited by examiner

METHOD, APPARATUS, SYSTEM AND COMPUTER PROGRAM

This application is a national stage entry of PCT Application No. PCT/CN2014/090830 filed Nov. 11, 2014, entitled "METHOD, APPARATUS, SYSTEM AND COMPUTER PROGRAM" which is hereby incorporated by reference in its entirety.

FIELD

The present application relates to a method, apparatus, system and computer program and in particular but not exclusively, to asymmetric power usage based inter-operator spectrum sharing in the scenario of co-primary sharing.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

SUMMARY OF THE INVENTION

In a first aspect there is provided a method comprising: controlling receiving, in a first network, negotiation information for the asymmetric power usage of a shared spectrum; determining, in the first network, a minimum spectrum demand in dependence on the negotiation information; controlling receiving, in the first network, a minimum spectrum demand information from at least one second network; and determining, in the first network, asymmetric power usage of the shared spectrum in dependence on the minimum spectrum demand from the at least one second network and the minimum spectrum demand of the first network.

According to some embodiments, said determining asymmetric power usage comprises allocating spectrum resources between the first network and the at least one second network.

According to some embodiments, said negotiation information comprises at least one of power level information, minimum spectrum configuration information and reference signal received power information.

According to some embodiments the method comprises, on detection of a first event, causing a request for asymmetric power usage to be sent to the second network.

According to some embodiments, said receiving negotiation information is in response to said causing a request for asymmetric power usage to be sent to the second network.

According to some embodiments, the event is a change in at least one of traffic, topology and signal to interference and noise ratio.

According to some embodiments, the method comprises receiving a response from the second network.

According to some embodiments, the response comprises at least one of a target operator flag and an asymmetric power usage indicator.

According to some embodiments, determining asymmetric power usage comprises using one of a dynamic division method, a fixed division method and a semi-dynamic division method.

According to some embodiments, the method comprises: controlling sending first network negotiation information to the at least one second network.

According to some embodiments, the method comprises: controlling sending the first network minimum spectrum demand to the at least one second network.

According to some embodiments, the first network minimum spectrum demand is sent in a dedicated message.

According to some embodiments, the method comprises controlling sending asymmetric power usage information to an access node.

In a second aspect there is provided a computer program comprising computer executable instructions which when run on one or more processors perform the method of the first aspect.

In a third aspect there is provided an apparatus comprising means for carrying out the method according to the first aspect.

In a fourth aspect there is provided an apparatus comprising at least one processor; and at least one memory including computer program code; the at least one memory and the computer program code configured to, with the at least one processor, cause the apparatus at least to: control receiving, in a first network, negotiation information for the asymmetric power usage of a shared spectrum; determine, in the first network, a minimum spectrum demand in dependence on the negotiation information; control receiving, in the first network, a minimum spectrum demand information from at least one second network; and determine, in the first network, asymmetric power usage of the shared spectrum in dependence on the minimum spectrum demand from the at least one second network and the minimum spectrum demand of the first network.

According to some embodiments, said determining asymmetric power usage comprises allocating spectrum resources between the first network and the at least one second network.

According to some embodiments, said negotiation information comprises at least one of power level information, minimum spectrum configuration information and reference signal received power information.

According to some embodiments, on detection of a first event, the apparatus is configured to cause a request for asymmetric power usage to be sent to the second network.

According to some embodiments, said receiving negotiation information is in response to said causing a request for asymmetric power usage to be sent to the second network.

According to some embodiments, the event is a change in at least one of traffic, topology and signal to interference and noise ratio.

According to some embodiments, the apparatus is configured to receive a response from the second network.

According to some embodiments, the response comprises at least one of a target operator flag and an asymmetric power usage indicator.

According to some embodiments, determining asymmetric power usage comprises using one of a dynamic division method, a fixed division method and a semi-dynamic division method.

According to some embodiments, the apparatus is configured to control sending first network negotiation information to the at least one second network.

According to some embodiments, the apparatus is configured to: control sending the first network minimum spectrum demand to the at least one second network.

According to some embodiments, the first network minimum spectrum demand is sent in a dedicated message.

According to some embodiments, the apparatus is configured to control sending asymmetric power usage information to an access node.

According to some embodiments, the apparatus is configured to communicate a negotiation ending message between the first network and the at least one second network.

According to some embodiments, the negotiation ending message comprises one or more of: an ending indicator, final values to be used by the first network and the at least one second network, spectrum sharing rules that the first network and the at least one second network will follow in the spectrum sharing procedure, a time period within which the minimum spectrum demand message should be sent.

According to a fifth aspect there is provided an apparatus comprising means for controlling receiving, in a first network, negotiation information for the asymmetric power usage of a shared spectrum; means for determining, in the first network, a minimum spectrum demand in dependence on the negotiation information; means for controlling receiving, in the first network, a minimum spectrum demand information from at least one second network; and means for determining, in the first network, asymmetric power usage of the shared spectrum in dependence on the minimum spectrum demand from the at least one second network and the minimum spectrum demand of the first network.

According to some embodiments, said determining asymmetric power usage comprises allocating spectrum resources between the first network and the at least one second network.

According to some embodiments, said negotiation information comprises at least one of power level information, minimum spectrum configuration information and reference signal received power information.

According to some embodiments, on detection of a first event, the apparatus comprises means for causing a request for asymmetric power usage to be sent to the second network.

According to some embodiments, said receiving negotiation information is in response to said causing a request for asymmetric power usage to be sent to the second network.

According to some embodiments, the event is a change in at least one of traffic, topology and signal to interference and noise ratio.

According to some embodiments, the apparatus comprises means for receiving a response from the second network.

According to some embodiments, the response comprises at least one of a target operator flag and an asymmetric power usage indicator.

According to some embodiments, determining asymmetric power usage comprises using one of a dynamic division method, a fixed division method and a semi-dynamic division method.

According to some embodiments, the apparatus comprises means for controlling sending first network negotiation information to the at least one second network.

According to some embodiments, the apparatus comprises means for: sending the first network minimum spectrum demand to the at least one second network.

According to some embodiments, the first network minimum spectrum demand is sent in a dedicated message.

According to some embodiments, the apparatus is configured to control sending asymmetric power usage information to an access node.

According to some embodiments, the apparatus is configured to communicate a negotiation ending message between the first network and the at least one second network.

According to some embodiments, the negotiation ending message comprises one or more of: an ending indicator, final values to be used by the first network and the at least one second network, spectrum sharing rules that the first network and the at least one second network will follow in the spectrum sharing procedure, a time period within which the minimum spectrum demand message should be sent.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples. It should be appreciated that the systems, apparatuses or embodiments given below are only presented as examples, not as limiting the implementation of shown principles or mechanisms.

Figure 1:
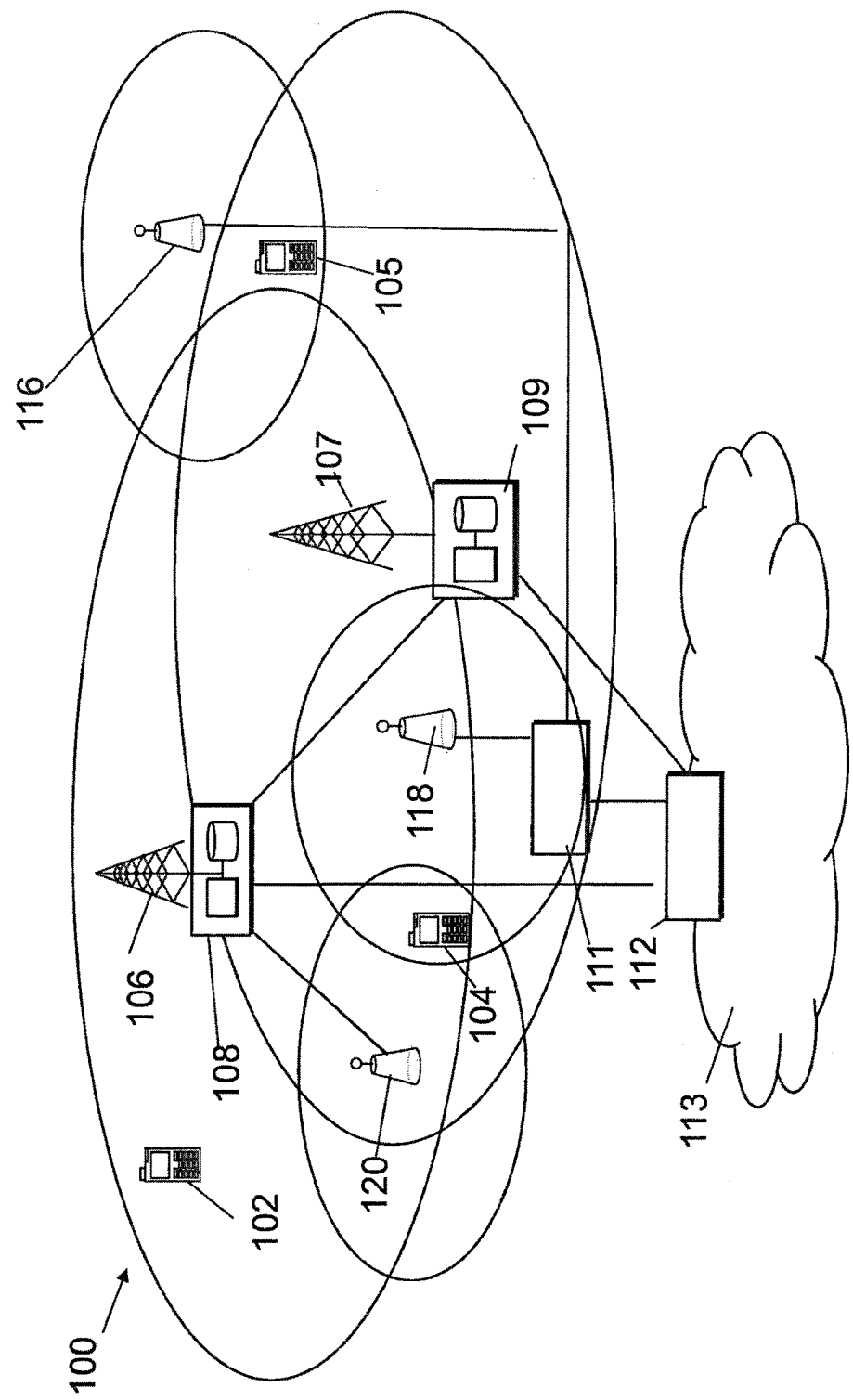
FIG. 1 shows a schematic diagram of an example communication system comprising a base station and a plurality of communication devices.
Figure 2:
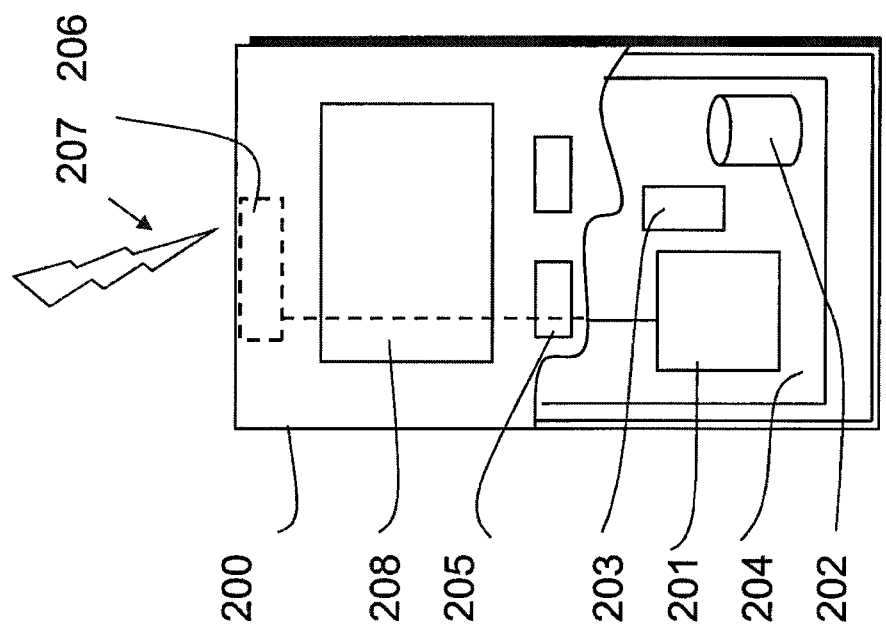
FIG. 2 shows a schematic diagram, of an example mobile communication device.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station may be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 8.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

The embodiments are not, however, restricted to the system given as an example but a person skilled in the art may apply the solution to other communication systems provided with necessary properties. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

70% of traffic may be generated indoors. Small cells as low-powered radio access nodes may provide an efficient way to improve cellular coverage, capacity and applications for homes and enterprises. In traditional spectrum policy, each operator (OP) owns a fixed block of spectrum. However, spectrum resource is limited and, as traffic increases, the available spectrum may become scarcer. If the fixed spectrum is used by only one operator, some spectrum will be wasted when there is no traffic.

Inter-operator spectrum sharing (SS) may address the low spectrum utilization problem due to the fixed spectrum assignment.

In a co-primary inter-operator SS system, as the small cells are usually deployed densely, a user device (UE) may experience inter-operator interference as well as intra-operator interference. If orthogonal frequency is allocated for different operators, the inter-operator interference can be cancelled but some spectrum resource may be wasted as well; however, when non-orthogonal frequency allocation is used, there may be heavy inter-operator interference. A better way to use spectrum efficiently would be to allocate the spectrum non-orthogonally with low inter-operator interference. If there is no mechanism to coordinate the spectrum usage between two operators, UEs may be strongly interfered by inter-operator Small Evolved NodeBs (SeNBs) when the same frequency is used.

Figure 3:
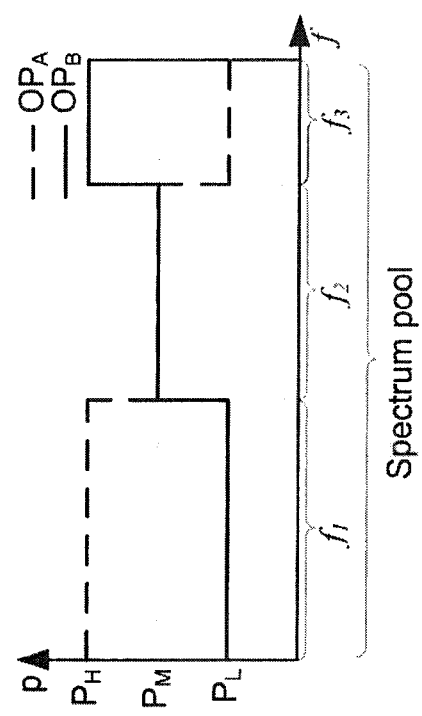
FIG. 3 shows an example division of a spectrum pool.

Power profile based interference coordination may be used in interference management. Based on the idea of power profile based interference coordination, embodiments of an asymmetric power usage method are proposed for interference control. Asymmetric power usage of a shared spectrum may involve dividing the spectrum pool into several parts, and operators may use each part with asymmetric transmit power levels. FIG. 3 shows an example division of a spectrum pool. In this example, the whole spectrum pool is divided into three smaller spectrum bands $f_1$, $f_2$ and $f_3$; and there could be assigned individual power levels for each bands, high power level $P_H$, middle power level $P_M$ and low power level $P_L$. Operator A may transmit on the spectrum band $f_1$ with $P_H$ while operator B may use $P_L$ in this part; for the spectrum band $f_2$ operator A and operator B can use the same middle power leve $IP_M$; Operator A may transmit on the spectrum band $f_3$ with $P_L$ while operator B may use $P_H$ in this band. This is known as asymmetric power usage.

The existing spectrum sharing research focuses mostly on intra-operator interference, and technologies have been proposed to cancel the intra-operator interference. However, inter-operator interference may be difficult to diminish or eliminate due to the sensitivity of inter-operator information exchange. In prior research, it was usually considered to have a primary system and some secondary systems in the spectrum sharing system model. In this situation, when a frequency is needed by the primary system, the secondary system must concede. However, such situation is only one of the scenarios that are considered in B4G/5G. Another scenario under consideration is co-primary inter-operator spectrum sharing, in which all the operators will have equal rights for the co-shared spectrum. Traditional soft frequency reuse is to use a fixed power for a specific cell on a specific frequency. For inter-operator spectrum sharing scenario, soft frequency usage is to allocate a maximal power for an operator on a specific frequency band.

Spectrum sharing has been proposed to exploit spectrum efficiency in future communication systems, and interference coordination may be required to implement spectrum sharing.

Figure 4:
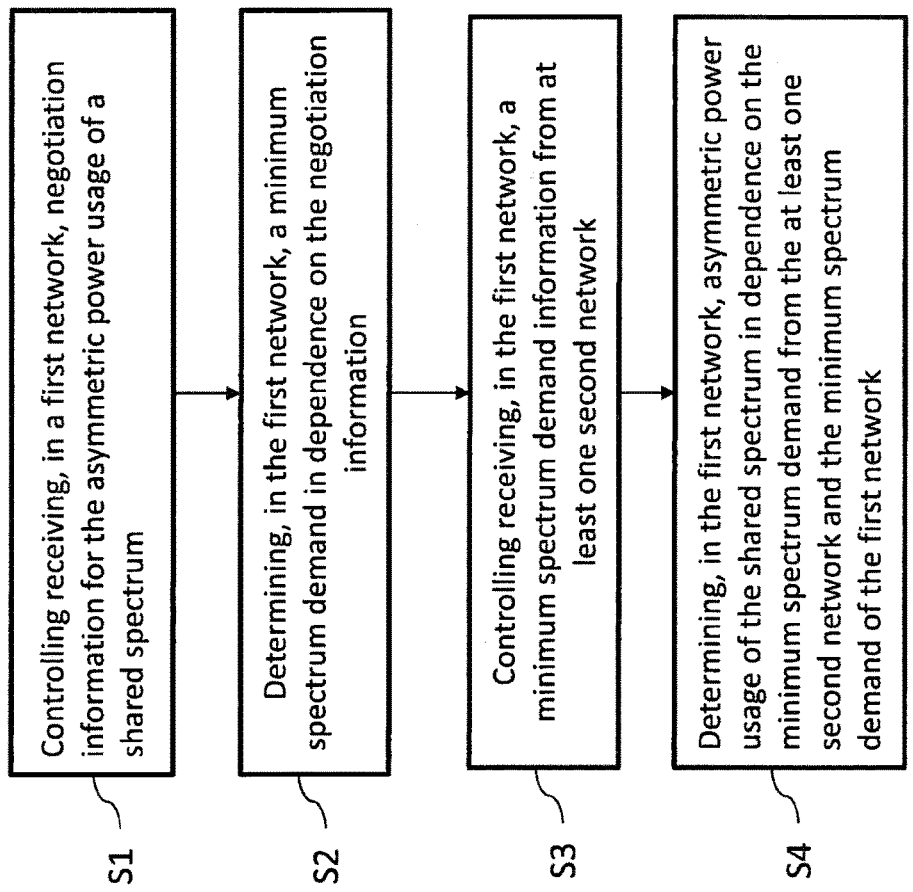
FIG. 4 shows a flowchart of an example of a method of performing an asymmetric power usage mechanism according to an embodiment.

FIG. 4 shows a flowchart of an example of a method of performing an asymmetric power usage mechanism. The method may be carried out by a spectrum controller or other suitable apparatus. The method comprises in a first step (S1), controlling receiving, in a first network, negotiation information for the asymmetric power usage of a shared spectrum. In a second step (S2) the method comprises determining, in the first network, a minimum spectrum demand in dependence on the negotiation information. In a third step (S3) the method comprises controlling receiving, in the first network, a minimum spectrum demand information from at least one second network and in a fourth step (S4) determining, in the first network, asymmetric power usage of the shared spectrum in dependence on the minimum spectrum demand from the at least one second network and the minimum spectrum demand of the first network. The method may provide inter-operator co-primary spectrum sharing for small cells to facilitate flexible spectrum utilization (FSU).

A method such as that of FIG. 4 and corresponding signalling mechanism may facilitate asymmetric power usage based inter-operator SS. Asymmetric power usage mechanism for inter-operator spectrum sharing may improve spectrum efficiency. Once the proposed scheme is triggered, the two operators can jointly cooperate with each other and can achieve a mutually beneficial result.

Based on the asymmetric power usage method, some further details of an inter-operator spectrum sharing mechanism are described below with related information exchange and signalling messages.

The mechanism may be event triggered. The events may include, for example, a change of traffic, topology, SINR, and/or any other suitable parameters relevant to a spectrum demand.

In the proposed exemplifying mechanism, the operator triggered by an event is referred to as the source operator or first network, and the other operator as the targeted operator or second network.

When one operator (or the spectrum controller, SC, serving the network) is triggered by an event, the source operator, using for example the corresponding SC, may send an asymmetric power usage request message to a second network, for example to the SC of the targeted operator. This message may include the following parameters:

Source operator flag indicates which operator the message comes from.

Asymmetric power usage indicator which means the source operator wants to use the proposed asymmetric power usage mechanism.

The request message, in some embodiments, is a negotiation message i.e to begin negotiations for power usage, as will be described in more details below (see for example FIG. 5 and the description related thereto).

When the second network, e.g., SC of targeted operator, has received an asymmetric power usage request message, it may send an asymmetric power usage response, e.g. an asymmetric power usage request ACK/NACK message to the first network. This message may include the following parameters:

Targeted operator flag indicates which operator the message goes to.

Asymmetric power usage indicator ACK/NACK indicates if the targeted operator agrees with the request or not.

To implement this asymmetric power usage method, some messages may be needed to negotiate between two operators dynamically. This inter-operator negotiation message may comprise negotiation information. The negotiation information may comprise parameters such as power levels, which can be assumed as a function of traffic, intra-operator interference, inter-operator interference, etc. Each operator may compute its own power levels according to a certain criterion, and then negotiate with the other operator to determine a fair value. Negotiation information may include parameters such as reference signal received power (RSRP) information. RSRP threshold may need to be negotiated between involved operators to ensure that common parameters are used to construct the intra-operator neighbour relation table (NRT) and intra-operator interference relation matrix (IRM), therefore to provide fair sharing to certain extent. Negotiation information may include minimum spectrum configuration which indicates the minimal spectrum/channels to be allocated for each operator if it presents. The value of the minimum spectrum configuration may be determined based on the traffic volume, topology etc. When this parameter is set to 1, it may be ignored.

With the negotiation information, each operator or network (SC) may compute the minimum spectrum demand and exchange it with at least one other operator. The minimum spectrum demand message may be included in the negotiation parameters or considered as an independent message. Then, using the shared spectrum pool division method introduced below, each network, or SC, can determine the spectrum band for each power level respectively. In some embodiments, the minimum spectrum demand is sent in a dedicated message.

When the spectrum division has been done, SCs of source operator and targeted operator may send an inter-operator negotiation procedure ending message to each other with, for example, at least one of the following parameters: Inter-operator negotiation procedure ending indicator, the negotiated parameters which is the final values used for the two operators, inter-operator spectrum sharing rules that the operators will be followed in the spectrum sharing procedure, time period within which the minimum spectrum demand message should be send.

To use the spectrum more efficiently, a reasonable spectrum pool division for each power level is important. There may be three options to divide the spectrum pool into several spectrum bands:

The first option is known as the dynamic division method. As the minimum spectrum demand may vary with the change of topology, traffic, signal-to-interference ratio (SINR), etc, the size of each divided spectrum band will be changed dynamically. It can be triggered when the minimum spectrum demand varies largely, such as the minimum spectrum demand of one operator is 20% higher or lower than the offered spectrum.

The second option is called as the fixed division method. In contrast to the dynamic division method, it could be triggered when the minimum spectrum demand of both operators is stable enough.

The third option is called as the semi-dynamic division method. The semi-dynamic division method is a hybrid method of adaptive division method and fixed division method. At the initial phase, the fixed division method could be used and the division result will be applied under the given condition, such as the traffic is within the range of offered spectrum. Once the condition can't be met (e.g., the traffic of one operator is 20% higher or lower than the offered spectrum), the adaptive division method could be used.

Figure 5:
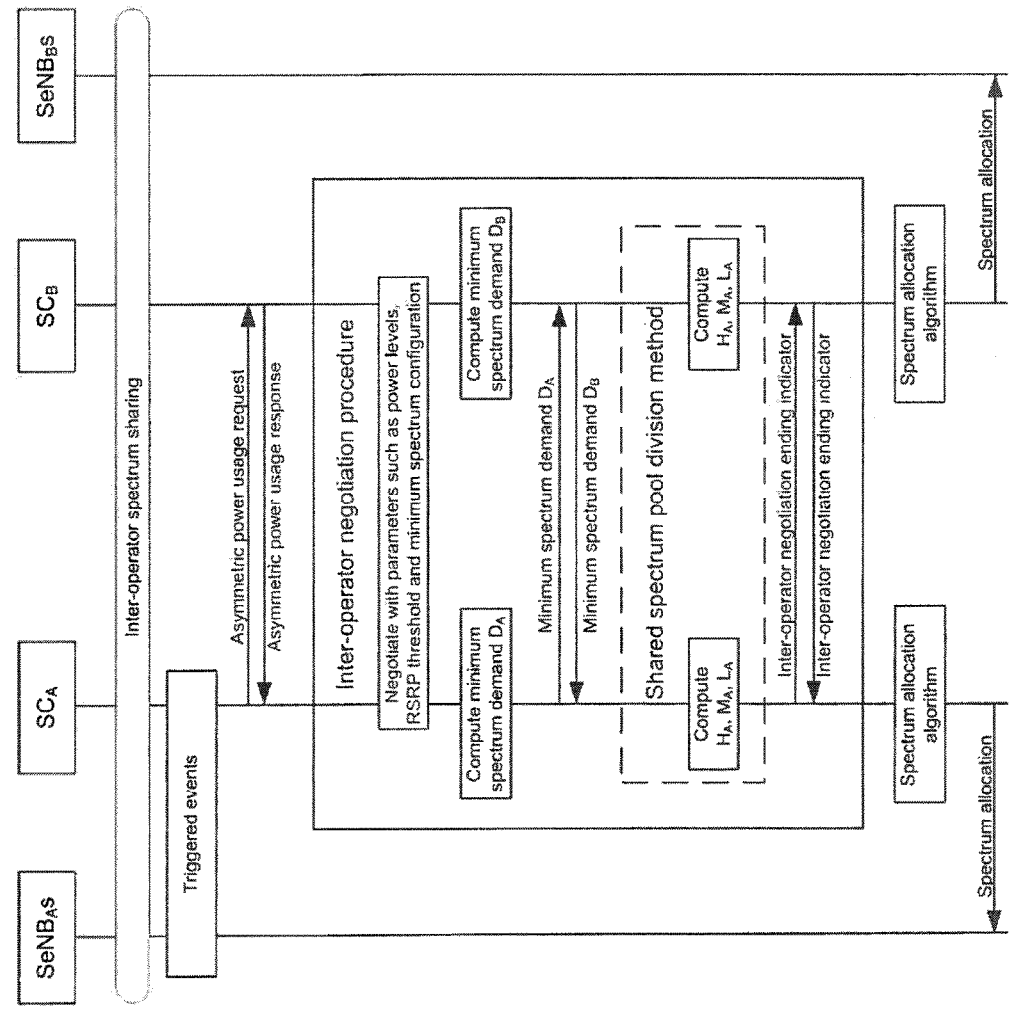
FIG. 5 shows an example flowchart of asymmetric power usage based inter-operator spectrum sharing mechanism according to an embodiment

FIG. 5 shows an example flowchart of the proposed asymmetric power usage based inter-operator spectrum sharing mechanism. There are only two operators, i.e. operator A and operator B shown for convenience of description, but the proposal may extend to more operators. The mechanism may provide inter-operator co-primary spectrum sharing for small cells to facilitate flexible spectrum utilization (FSU).

Operator A and operator B are assumed to be sharing the spectrum with a fixed power. When the asymmetric power usage is triggered by an event, the proposed inter-operator SS mechanism will be started. We assume operator A is the source operator and operator B is the targeted operator here. Procedures and signaling messages in the flowchart are listed as follows:

(1) Asymmetric power usage mechanism is triggered by some events at source operator A, such as change of traffic, topology, SINR, etc.

(2) When $SC_A$ (spectrum controller of operator A) wants to start the asymmetric power usage mechanism, it will send an asymmetric power usage request message to $SC_B$.

(3) $SC_B$ answers an asymmetric power usage request (acknowledgement) ACK message to $SC_A$ when it received the asymmetric power usage request message from $SC_A$.

(4) Each SC computes the minimum spectrum demand based on the negotiated information. It can be calculated from the maximum clique of the interference matrix.

(5) $SC_A$ and $SC_B$ exchange the minimum spectrum demand information.

(6) Compute the sizes of high power spectrum band $H_A$ and $H_B$, middle power spectrum band $M_A$ and $M_B$ and low power spectrum band $L_A$ and $L_B$ for each operator using the shared spectrum pool division method.

(7) When the spectrum band division has done, $SC_A$ and $SC_B$ will send an inter-operator negotiation ending indicator message to each other.

(8) $SC_A$ and $SC_B$ get the allocated spectrum for each SeNB using the proposed intra-operator spectrum allocation algorithm.

(9) $SC_A$ and $SC_B$ allocate the corresponding spectrum to each SeNB using the spectrum allocation result.

When a minimum spectrum demand is changed, the information may be exchanged between operators to trigger the re-division. A specific example using maximum clique of interference relation matrix (IRM) to calculate demands of spectrum bands is provided in equations 1 and 2. For convenience and without loss of generality, in the following we assume the spectrum pool is a set of sub-channels, and the minimum unit of spectrum/sub-channels to allocate for SeNB is min_configuration spectrum bandwidth/sub-channels. The minimum spectrum configuration may be set flexibly to satisfy the Quality of Service (QoS) and system demand. Each operator may compute the minimum spectrum demand $D_A$ and $D_B$ according to the maximum clique and the minimum configuration as follows:

$$D_A = \text{max\_clique}_A \times \text{min\_configuration} \tag{1}$$

$$D_B = \text{max\_clique}_B \times \text{min\_configuration} \tag{2}$$

Using the dynamic division method, after the minimum spectrum demand is exchanged between two operators, every operator may compute the spectrum band for each power level using the inter-operator and intra-operator minimum spectrum demand information. As the minimum spectrum demand may vary with the change of topology or traffic, the size of each divided spectrum band will be changed dynamically.

Using the fixed division method, the size of each divided spectrum band is typically fixed which means the division will not change once determined. In the initial phase of spectrum sharing procedure, operators decide the division together. For example, the division may be decided by the following methods:

Based on spectrum demand of each operator.
  It can be taken as a sampling of the dynamic division method and the division result will not change with the spectrum demand changes.
Equal high power spectrum band for each operator.
  Operators decide a certain division with equal high power spectrum band, which means $H_A = H_B$. This method may be fairer for the two operators than the last method.

The fixed division method is simpler than the adaptive division one, but it does not care about the variety of topology or traffic thus not flexible.

In the case of the semi-dynamic division method, a hybrid method of adaptive division method and fixed division method, at the initial phase, the fixed division method could be used and the division result will be applied under the given condition, such as the traffic is within the range of offered spectrum. Once the condition can't be met (e.g., the traffic of one operator is 20% higher or lower than the offered spectrum), the semi-dynamic division method could be used.

Figure 6:
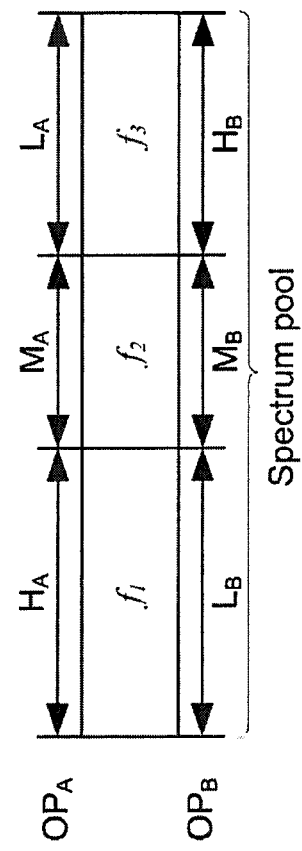
FIGS. 6 to 9 show examples of division of a spectrum pool according to embodiments.

As shown in FIG. 6, the whole spectrum pool is divided into three smaller spectrum bands, which are $f_1$, $f_2$ and $f_3$. $H_A$ is high power spectrum band of $OP_A$, $M_A$ means middle power spectrum band of $OP_A$ and $L_A$ indicates low power spectrum band of $OP_A$, and the case is opposite for $OP_B$.

In the proposed exemplifying method, the size of each divided spectrum band may be determined by the minimum spectrum demand $D_A$ and $D_B$ of the two operators dynamically. For a normal case as indicated in equation 3, the number of high power sub-channels $H_A$ and $H_B$ may be considered as the minimum spectrum demand $D_A$ and $D_B$:

$$H_A = D_A, H_B = D_B \tag{3}$$

When the high power spectrum band is determined, the number of middle power sub-channels for both the two operators may be computed as shown in equation 4:

$$M_A = M_B = \text{total} - H_A - H_B \tag{4}$$

The number of low power sub-channels may be equal to the number of high power sub-channels of the other operator as shown in FIG. 5:

$$L_A = H_B, L_B = H_A \tag{5}$$

In the above equations, $\text{max\_clique}_i (i=A, B)$ denotes the maximum clique of the interference matrix, min_configuration means the minimum spectrum configuration for the resource allocation, and total is the number of all the sub-channels in the spectrum pool which is shared by the operators. $H_{A,B}$ is the number of high power sub-channels. $M_{A,B}$ is the number of middle power sub-channels. $L_{A,B}$ is the number of low power sub-channels. $D_{A,B}$ is the minimum spectrum demand of operators A and B respectively.

A subset of a graph is a clique if all the vertexes in this subset are connected with each other. If the maximum clique of operator A is 2, maximum clique of operator B is 3, the number of available sub-channels is 8 and the minimum configuration is 1, then the number of sub-channels for each power level can be got according to the above method:

$$H_A = 2 \times 1 = 2, M_A = 8 - 2 - 3 = 3, L_A H_B = 3 \tag{6}$$

$$H_B = 3 \times 1 = 2, M_B = 8 - 2 - 3 = 3, L_B H_A = 2 \tag{7}$$

When calculating the sizes of each part according to this method, there may be four cases as follows in equations 8 to 11. Total BW is total available bandwidth.

Case 1 is the case as shown in FIG. 6 wherein, $$\text{max\_clique}_A + \text{max\_clique}_B < \text{total\_}BW/\text{min\_configuration} \tag{8}$$

Figure 7:
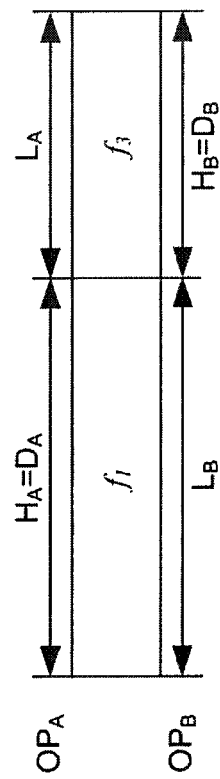

Case 2 is shown in FIG. 7, wherein $$\text{max\_clique}_A + \text{max\_clique}_B = \text{total\_}BW/\text{min\_configuration} \tag{9}$$

In this case, $M_A$ and $M_B$ will be null.

Figure 8:
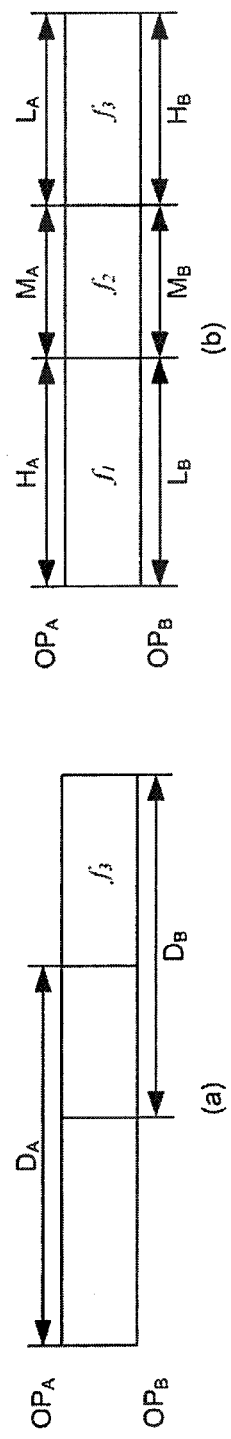

Case 3 is shown in FIG. 8 and $$\text{max\_clique}_A + \text{max\_clique}_B > \text{total\_}BW/\text{min\_configuration} \tag{10}$$

In this case, computed minimum spectrum demand $D_A$ and $D_B$ will overlap as shown in FIG. 8(a). The overlapped area is the middle power spectrum/sub-channels; then the computed minimum spectrum demand minus the middle power part is the high power spectrum/sub-channels; and the last as the low power spectrum/sub-channels which is shown in FIG. 8(b).

Figure 9:
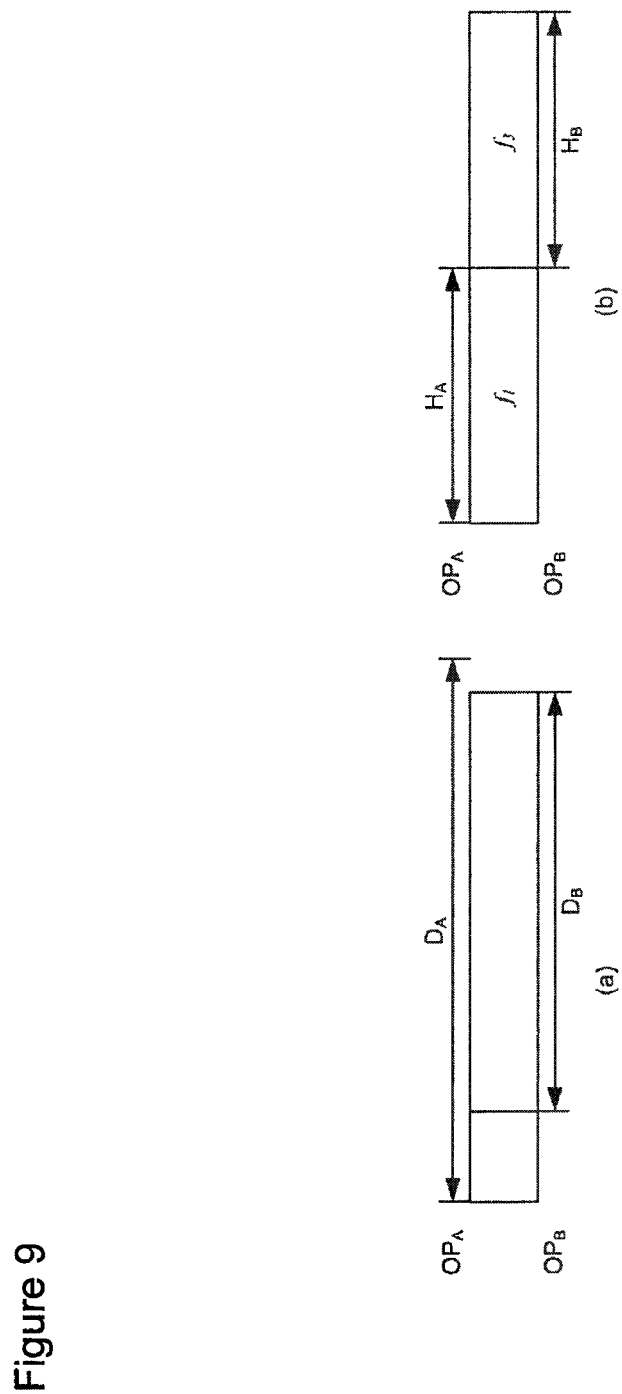

In the fourth case as shown in FIG. 9:

$$\text{max\_clique}_A > \text{total\_}BW/\text{min\_configuration or}$$
$$\text{max\_clique}_B > \text{total\_}BW/\text{min\_configuration} \tag{11}$$

In this case, computed minimum spectrum demand $D_A$ or $D_B$ may exceed the spectrum pool. For example, $D_A$ is larger than the spectrum pool as shown in FIG. 9(a). To provide fairness (at least substantially), the spectrum pool may be divided at least substantially equally as FIG. 9(b), where no middle power part exists.

It is noted that the spectrum pool division methods shown are simply examples and operators may use different methods to determine its own minimum spectrum demand.

Figure 10:
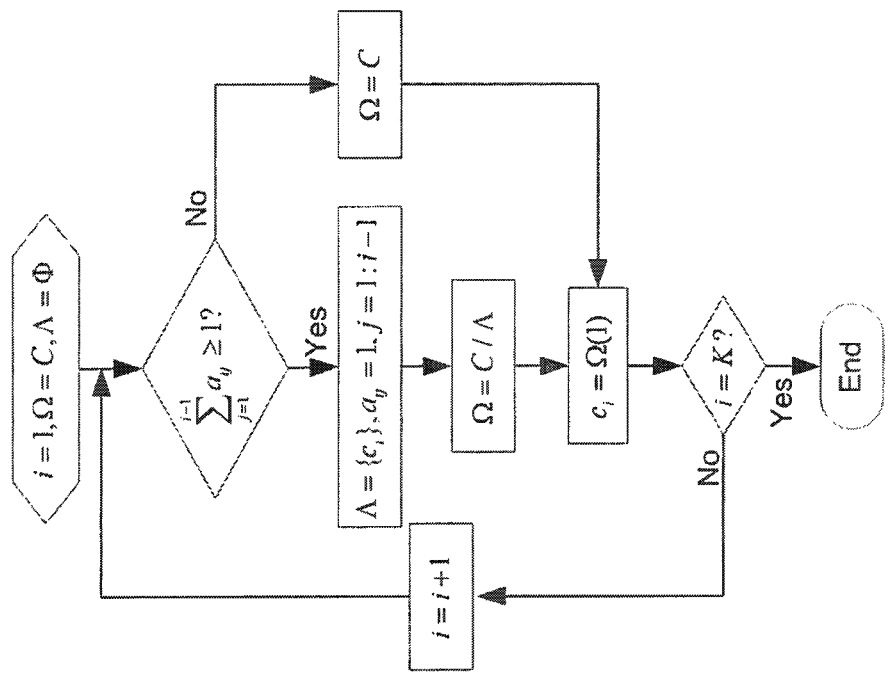
FIG. 10 shows an algorithm to allocate intra-operator spectrum according to an embodiment.

To allocate intra-operator spectrum an algorithm such as that shown in FIG. 10 may be used.

Denote $c_i \in C$ is the index of allocated spectrum for ith SeNB where C is the whole spectrum pool and $a_{ij}$ as the element of interference relation matrix where $$a_{ij} = \begin{cases} 0, & SeNB_i \text{ and } SeNB_j \text{ are not neighbors} \\ 1, & SeNB_i \text{ and } SeNB_j \text{ are neighbors} \end{cases} \quad (12)$$

An example of an intra-operator spectrum allocation algorithm is shown in FIG. 10, where A denotes the unavailable spectrum set, $\Omega$ is the available spectrum set and K is the number of SeNBs. To be noted, the available spectrum set $\Omega_A$ of operator A and available spectrum set $\Omega_B$ of operator B are in opposite order according to the above analysis. To avoid inter-operator interference (IOI), when allocate the spectrum for each operator, the high power sub-channels always has the highest priority, then the middle power area and the low power area will be the last. The first step is initialization for SeNBindex i=1, available spectrum set $\Omega=C$ where C means the shared spectrum pool, and unavailable spectrum set $\Lambda=\Phi$. The second step is to decide if the ith SeNB has any neighbour relation with the first i−1 SeNBs or not. If it is, go to the next step; otherwise, the available spectrum set $\Omega$ will be the whole spectrum pool C and turn to Step 5. In the third step the unavailable spectrum set $\Lambda$ is constructed with the allocated spectrum of its neighbours. In a fourth step, the available spectrum set $\Omega$ is calculated from the whole spectrum pool C minus the unavailable spectrum set $\Lambda$. In a fifth step the first spectrum of available spectrum set $\Omega$ is allocated to the ith SeNB. The sixth step is to decide if i=K or not, where K is the number of SeNBs. If it is, end the procedure; otherwise, go to Step 2.

The proposed inter-operator spectrum sharing mechanism may be desirable when spectrum is scarce and can improve the spectrum efficiency.

Asymmetric power is used for the different spectrum band and may thus reduce the inter-operator interference. The proposed mechanism may be triggered by specific events which can reduce the signaling overhead.

It should be understood that each block of the flowchart of FIG. 4 or 5 and any combination thereof may be implemented by various means or their combinations, such as hardware, software, firmware, one or more processors and/or circuitry.

Figure 11:
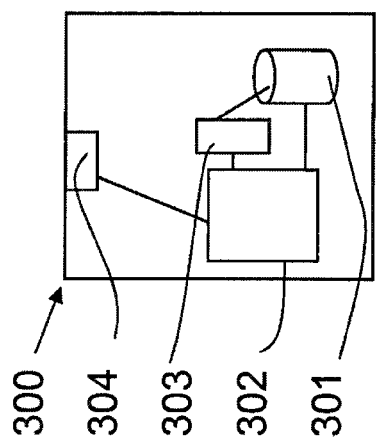
FIG. 11 shows an example of a control apparatus, according to an embodiment.

Embodiments described above by means of FIGS. 1 to 10 may be implemented on apparatus, such as a node, host or server, or in a unit, module etc. providing control functions as shown in FIG. 11 or on a mobile device such as that of FIG. 2 (or in a unit module etc. in the mobile device). FIG. 11 shows an example of such an apparatus. In some embodiments, a base station, node, host or server comprises a separate unit or module for carrying out control functions. In other embodiments, the control functions can be provided by another network element such as a radio network controller or a spectrum controller. The apparatus 300 can be arranged to provide control on communications in the service area of the system. The apparatus 300 comprises at least one memory 301, at least one data processing unit 302, 303 and an input/output interface 304. Via the interface the apparatus may be coupled to a receiver and a transmitter of the base station. The receiver and/or the transmitter may be implemented as a radio front end or a remote radio head. For example the apparatus 300 may be configured to execute an appropriate software code to provide the control functions. Control functions may include controlling receiving, in a first network, negotiation information for the asymmetric power usage of a shared spectrum; determining, in the first network, a minimum spectrum demand in dependence on the negotiation information; controlling receiving, in the first network, a minimum spectrum demand information from at least one second network; and determining, in the first network, asymmetric power usage of the shared spectrum in dependence on the minimum spectrum demand from the at least one second network and the minimum spectrum demand of the first network.

An example of an apparatus comprises means (302, 303) for controlling receiving, in a first network, negotiation information for the asymmetric power usage of a shared spectrum; means (302, 303) for determining, in the first network, a minimum spectrum demand in dependence on the negotiation information; means (302, 303) for controlling receiving, in the first network, a minimum spectrum demand information from at least one second network; and means (302, 303) for determining, in the first network, asymmetric power usage of the shared spectrum in dependence on the minimum spectrum demand from the at least one second network and the minimum spectrum demand of the first network.

It should be understood that the apparatuses may include or be coupled to other units or modules etc., such as radio parts or (remote) radio heads, used in or for transmission and/or reception. Although the apparatuses have been described as one entity, different modules and memory may be implemented in one or more physical or logical entities.

It is noted that whilst embodiments have been described in relation to LTE, similar principles can be applied to any other communication system or radio access technology. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 11 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions thereof.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 11 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
   controlling receiving, in a first network, negotiation information for an asymmetric power usage of a shared spectrum;
   determining, in the first network, a minimum spectrum demand in dependence on the negotiation information;
   controlling receiving, in the first network, a minimum spectrum demand from at least one second network; and
   determining, in the first network, asymmetric power usage of the shared spectrum in dependence on the minimum spectrum demand from the at least one second network and the minimum spectrum demand of the first network.

2. The method according to claim 1, wherein said determining asymmetric power usage comprises allocating spectrum resources between the first network and the at least one second network.

3. The method according to claim 1, wherein said negotiation information comprises at least one of power level information, minimum spectrum configuration information and reference signal received power information.

4. The method according to claim 1 comprising on detection of a first event, causing a request for asymmetric power usage to be sent to the second network.

5. The method according to claim 4, wherein the event is a change in at least one of traffic, topology and signal to interference and noise ratio.

6. The method according to claim 4, wherein the response comprises at least one of a target operator flag and an asymmetric power usage indicator.

7. The method according to claim 1, comprising receiving a response from the second network.

8. The method according to claim 1, wherein determining asymmetric power usage comprises using one of a dynamic division method, a fixed division method and a semi-dynamic division method.

9. The method according to claim 1, comprising: controlling sending first network negotiation information to the at least one second network.

10. The method according to claim 1, comprising: controlling sending the first network minimum spectrum demand to the at least one second network.

11. The method according to claim 10 wherein the first network minimum spectrum demand is sent in a dedicated message.

12. The method according to claim 1, comprising controlling sending asymmetric power usage information to an access node.

13. A computer program embodied on a non-transitory computer-readable medium, the computer program comprising computer executable instructions which when run on one or more processors perform the method of claim 1.

14. An apparatus comprising at least one processor;
   and at least one memory including computer program code;
   the at least one memory and the computer program code configured to, with the at least one processor, cause the apparatus at least to:
   control receiving, in a first network, negotiation information for an asymmetric power usage of a shared spectrum;
   determine, in the first network, a minimum spectrum demand in dependence on the negotiation information;
   control receiving, in the first network, a minimum spectrum demand from at least one second network; and
   determine, in the first network, asymmetric power usage of the shared spectrum in dependence on the minimum spectrum demand from the at least one second network and the minimum spectrum demand of the first network.

15. The apparatus according to claim 14, wherein said determining asymmetric power usage comprises allocating spectrum resources between the first network and the at least one second network.

16. The apparatus according to claim 14, wherein said negotiation information comprises at least one of power level information, minimum spectrum configuration information and reference signal received power information.

17. The apparatus according to claim 14, wherein on detection of a first event, the apparatus is configured to cause a request for asymmetric power usage to be sent to the second network.

18. The apparatus according to claim 17, wherein the event is a change in at least one of traffic, topology and signal to interference and noise ratio.

19. The apparatus according to claim 17, wherein the response comprises at least one of a target operator flag and an asymmetric power usage indicator.

20. The apparatus according to claim 14, wherein the apparatus is configured to receive a response from the second network.

21. The apparatus according to claim 14, wherein determining asymmetric power usage comprises using one of a dynamic division method, a fixed division method and a semi-dynamic division method.

22. The apparatus according to claim 14, wherein the apparatus is configured to control sending first network negotiation information to the at least one second network.

23. The apparatus according to claim 14, wherein the apparatus is configured to: control sending the first network minimum spectrum demand to the at least one second network.

24. The apparatus according to claim 23 wherein the first network minimum spectrum demand is sent in a dedicated message.

25. The apparatus according to claim 14, wherein the apparatus is configured to control sending asymmetric power usage information to an access node.

* * * * *